(12) United States Patent
Chen et al.

(10) Patent No.: US 7,123,469 B2
(45) Date of Patent: Oct. 17, 2006

(54) COMPUTER POWER SUPPLY MOUNTING APPARATUS

(75) Inventors: Yun-Lung Chen, Tu-Cheng (TW); Fa-Ming Jiang, Shenzhen (CN)

(73) Assignee: Hon Hai Precision Industry Co., Ltd., Taipei Hsien (TW)

( * ) Notice: Subject to any disclaimer, the term of this patent is extended or adjusted under 35 U.S.C. 154(b) by 45 days.

(21) Appl. No.: 10/930,383

(22) Filed: Aug. 31, 2004

(65) Prior Publication Data

US 2005/0099764 A1  May 12, 2005

(30) Foreign Application Priority Data

Nov. 11, 2003 (TW) .............................. 92219943 U

(51) Int. Cl.
H05K 5/00 (2006.01)
H05K 7/00 (2006.01)

(52) U.S. Cl. ..................................... 361/679
(58) Field of Classification Search ................ 361/679, 361/683; 248/221.11, 300, 200, 679; 312/223.1, 312/223.2
See application file for complete search history.

(56) References Cited

U.S. PATENT DOCUMENTS

| | | | | |
|---|---|---|---|---|
| 4,977,532 A * | 12/1990 | Borkowicz et al. | ......... | 361/683 |
| 5,690,306 A * | 11/1997 | Roesner | ................. | 248/222.52 |
| 5,790,372 A * | 8/1998 | Dewey et al. | ............. | 361/683 |
| 5,949,652 A * | 9/1999 | McAnally et al. | .......... | 361/726 |
| 6,214,664 B1 * | 4/2001 | Kimura et al. | .............. | 438/253 |
| 6,215,664 B1 * | 4/2001 | Hernandez et al. | ......... | 361/725 |
| 6,229,696 B1 * | 5/2001 | Lin et al. | .................... | 361/683 |
| 6,246,571 B1 * | 6/2001 | Lin et al. | .................... | 361/683 |
| 6,247,767 B1 * | 6/2001 | Liu et al. | ................. | 312/223.2 |
| 6,270,046 B1 * | 8/2001 | Liu et al. | ................. | 248/231.9 |
| 6,288,332 B1 * | 9/2001 | Liu et al. | .................... | 174/542 |
| 6,288,901 B1 | 9/2001 | Liu et al. | .................... | 361/724 |
| 6,483,696 B1 * | 11/2002 | Gan | .......................... | 361/683 |
| 6,530,628 B1 * | 3/2003 | Huang et al. | ............ | 312/223.2 |
| 6,582,150 B1 | 6/2003 | Davis et al. | ................ | 403/330 |
| 6,685,503 B1 * | 2/2004 | Huang et al. | ............... | 439/527 |
| 6,714,406 B1 * | 3/2004 | Chen | .......................... | 361/683 |
| 6,773,080 B1 * | 8/2004 | Chen et al. | .............. | 312/265.1 |
| 6,944,013 B1 * | 9/2005 | Yang | .......................... | 361/683 |
| 2001/0040203 A1 * | 11/2001 | Brock et al. | ........... | 248/222.11 |
| 2002/0089818 A1 * | 7/2002 | Chen | .......................... | 361/683 |
| 2004/0105222 A1 * | 6/2004 | Chen et al. | ................. | 361/683 |
| 2004/0136147 A1 * | 7/2004 | Chen et al. | ................. | 361/679 |

* cited by examiner

*Primary Examiner*—Lynn Feild
*Assistant Examiner*—Ingrid Wright
(74) *Attorney, Agent, or Firm*—Tim Tingkang Xia; Morris Manning Martin LLP

(57) ABSTRACT

A computer power supply mounting apparatus includes a plurality of screws (50) and a fixing plate (40) for attaching a power supply (80) to a rear panel (20) of a computer chassis (10). Each screw has a head (52) and a body (54). A diameter of the head is larger than a diameter of the body. The rear panel defines a plurality of apertures (22) for receiving the screws. Each aperture includes a large portion (221) and a small portion (223). A diameter of the large portion is larger than that of the head of the screw. A diameter of the small portion is smaller than that of the head of the screw, but larger than that of the body of the screw. The fixing plate is slidably attached to the rear panel and selectively positioned at a first position and a second position. The fixing plate has at least one lateral driving tab (63) for abutting against a corresponding screw.

23 Claims, 3 Drawing Sheets

COMPUTER POWER SUPPLY MOUNTING APPARATUS

BACKGROUND OF THE INVENTION

1. Field of the Invention

The present invention relates to a computer power supply, and particularly to a computer power supply mounting apparatus.

2. Description of the Related Art

Smaller computer designs require more efficient use of space within the chassis of the designs. Components are placed closer to each other due to their compact arrangement, which makes some difficulty to reach components awaiting for repair. Many personal computers include power supplies for converting the alternating current (AC) to a predetermined direct current (DC), which is used to operate the components of the computers. Some power supplies for personal computers are mounted directly to the chassis using screws. The accompanying inconvenience of this type of mounting technique always discourages designers from effectively using interior space when they have to consider how to reach these components afterwards.

A better method of mounting a power supply within a PC chassis is to have the power supply rotating out of the chassis to provide access to adjacent components. U.S. Pat. No. 6,270,046 B1 discloses such an apparatus for mounting a power supply in a computer system. The computer system includes a chassis which is formed by assembling front, rear and bottom panels together. The apparatus for mounting the power supply includes a drive cage and a bracket. The drive cage bridges between the front and rear panels and forms a pair of hooks. The bracket has a hinge portion and a support portion adapted to support the power supply. The hinge portion of the bracket is slidably engaged with the hooks for fixing the power supply to the rear panel of the chassis. However, this makes the computer structure complicated. An additional bracket is required for supporting the power supply. Additionally, in some computers, having the power supply rotated out of the chassis is restricted.

Therefore, what is needed is an improved apparatus for mounting a power supply within a PC chassis requiring minimal space, and displacing the power supply quickly and easily.

SUMMARY OF THE INVENTION

Accordingly, an object of the present invention is to provide a power supply mounting apparatus to enable easy and convenient installation and removal of a power supply.

To achieve the above-mentioned objects, a computer power supply mounting apparatus in accordance with a preferred embodiment of the present invention includes a plurality of screws and a fixing plate for attaching a power supply to a rear panel of a computer chassis. Each screw has a head and a body. A diameter of the head is larger than a diameter of the body. The rear panel defines a plurality of apertures for receiving the screws. Each aperture includes a large portion and a small portion. A diameter of the large portion is larger than that of the head of the screw. A diameter of the small portion being smaller than that of the head of the screw, but larger than that of the body of the screw. The fixing plate is slidably attached to the rear panel and selectively positioned at a first position and a second position. The fixing plate has at least one lateral driving tab for abutting against the screws.

Other objects, advantages and novel features of the present invention will be drawn from the following detailed description of the preferred embodiments of the present invention with the attached drawings, in which:

DETAILED DESCRIPTION OF THE INVENTION

Figure 1:
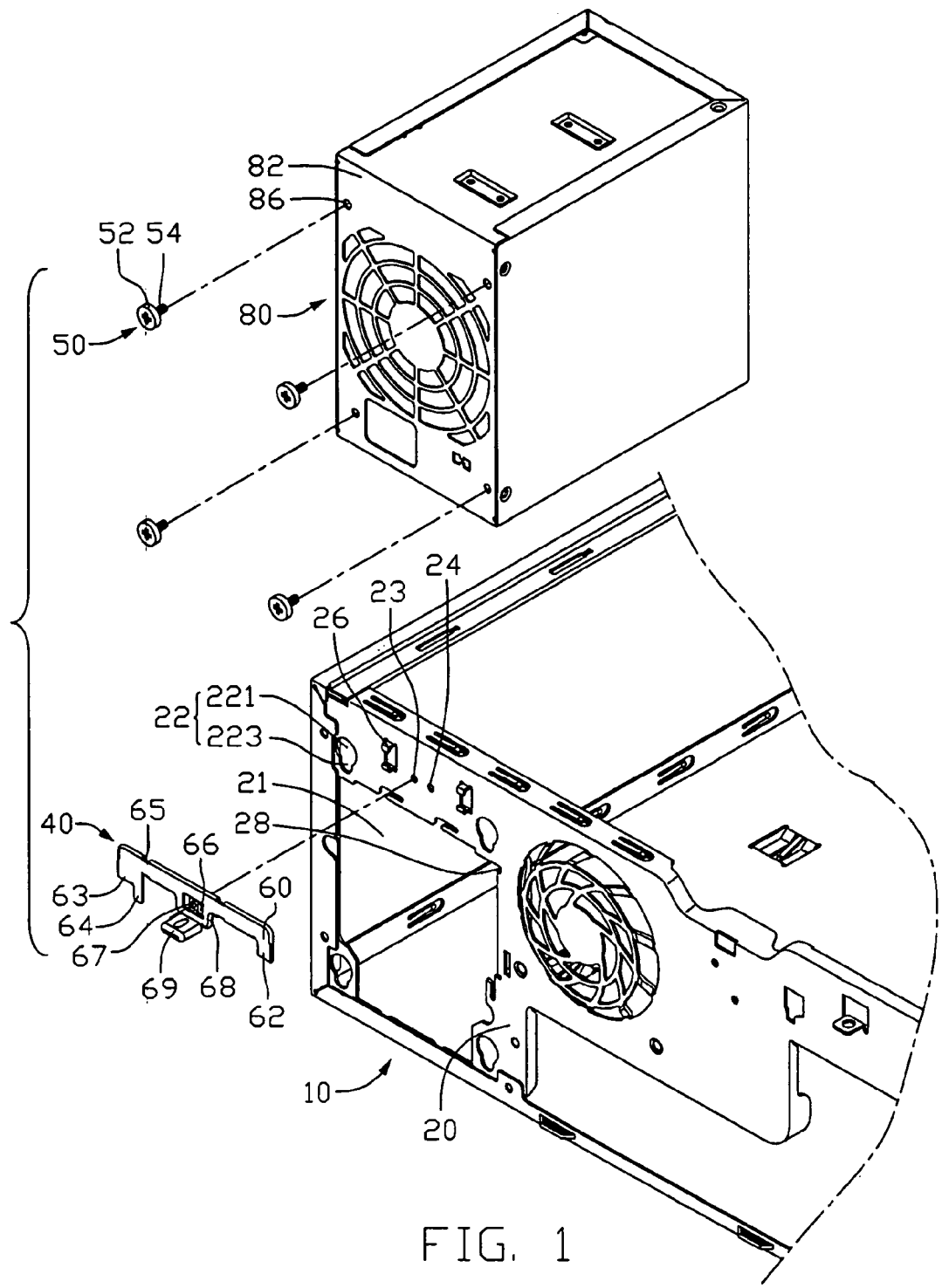
FIG. 1 is an exploded, isometric view of a computer power supply mounting apparatus in accordance with the preferred embodiment of the present invention.

Referring to FIG. 1, a computer in accordance with the preferred embodiment of the present invention comprises a chassis 10, a fixing plate 40 as a fixing member and a power supply 80.

The power supply 80 has a rectangular back surface 82 for attaching to the chassis 10. The back surface 82 defines a screw hole at each corner for receiving a screw 50 as a complementary mounting member. The screw 50 has a head 52 and a body 54. A diameter of the head 52 is larger than that of the body 54.

The chassis 10 has a rear panel 20 with a rectangular opening 21 defined at the top thereof. An aperture 22 as a mounting member is defined around each corner of the opening 21. The aperture 22 includes a small portion 223 and a large portion 221. A diameter of the large portion 221 is larger than that of the head 52 of the screw 50. A diameter of the small portion 223 is smaller than that of the head 52 of the screw 50, but larger than that of the body 52 of the screw 50. Beside the opening 21 a pair of guiding rails 26 is installed. Each guiding rail 26 is formed with a pair of separated tongues stamped outwardly from the rear panel 20. An upper locating hole 23 and a lower locating hole 24 are defined between the pair of guiding rails 26. At the lower edge of the opening 21, a supporting rack 28 is folded inwardly for supporting the power supply 80.

The fixing plate 40 has an elongate body with a pair of driving tabs 62, 63 formed at two ends thereof. An ear 64 extends outward further from the driving tab 63. A flat portion 68 is formed at a middle of the fixing plate 40 with a resilient tab 66 stamped therefrom. The resilient tab 66 has a boss 67 formed thereon. A handle 69 extends upwardly from a side of the flat portion 68. At two edges of the body of the fixing plate 40, two pairs of notches 65 are respectively defined between the driving tabs 62, 63 and the flat portion 68. A distance between the two pairs of notches 65 is equal to a distance between the pair of guiding racks 26, thereby facilitating the body of the fixing plate 40 being inserted between the guiding rails 26.

Figure 2:
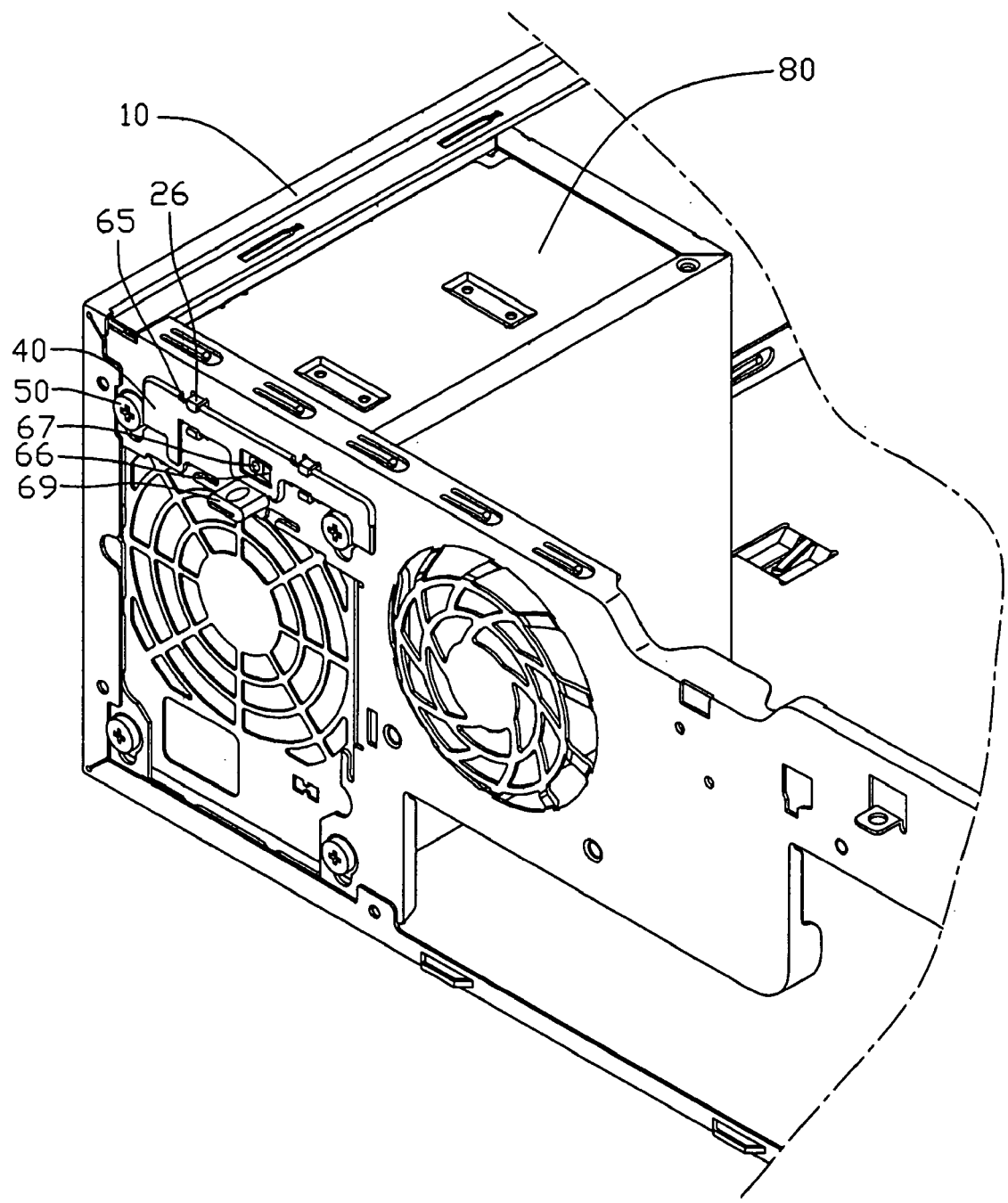
FIG. 2 is isometric view of the present invention, showing a power supply ready to be mounted.

In assembly, the fixing plate 40 is inserted between the guiding rails 26 initially with the boss 67 of the resilient tab 66 embedded in the lower locating hole 24. As shown in FIG. 2, the driving tabs 62, 63 of the fixing plate 40 are below the two apertures 22 at the right side of the rear panel 20 respectively.

The screws 50 are mounted on the power supply 80. There is a proper distance remaining between the heads 52 of the screws 50 and the back surface 82 of the power supply 80 in order for the head 52 engaging with the rear panel 20. The power supply 80 abuts against the rear panel 20 of the chassis 10 to define a reference plane, with the back surface 82 exposing to the opening 21. The power supply 80 is supported by the supporting rack 28 and other structures (not shown) in the chassis. The screw heads 52 are inserted into the large portions 221 of the apertures 22 in the rear panel 20. Then the power supply 80 is moved horizontally to have the screws 50 sliding into the small portions 223 of the apertures 22 and engaging with the rear panel 20 thereby.

Figure 3:
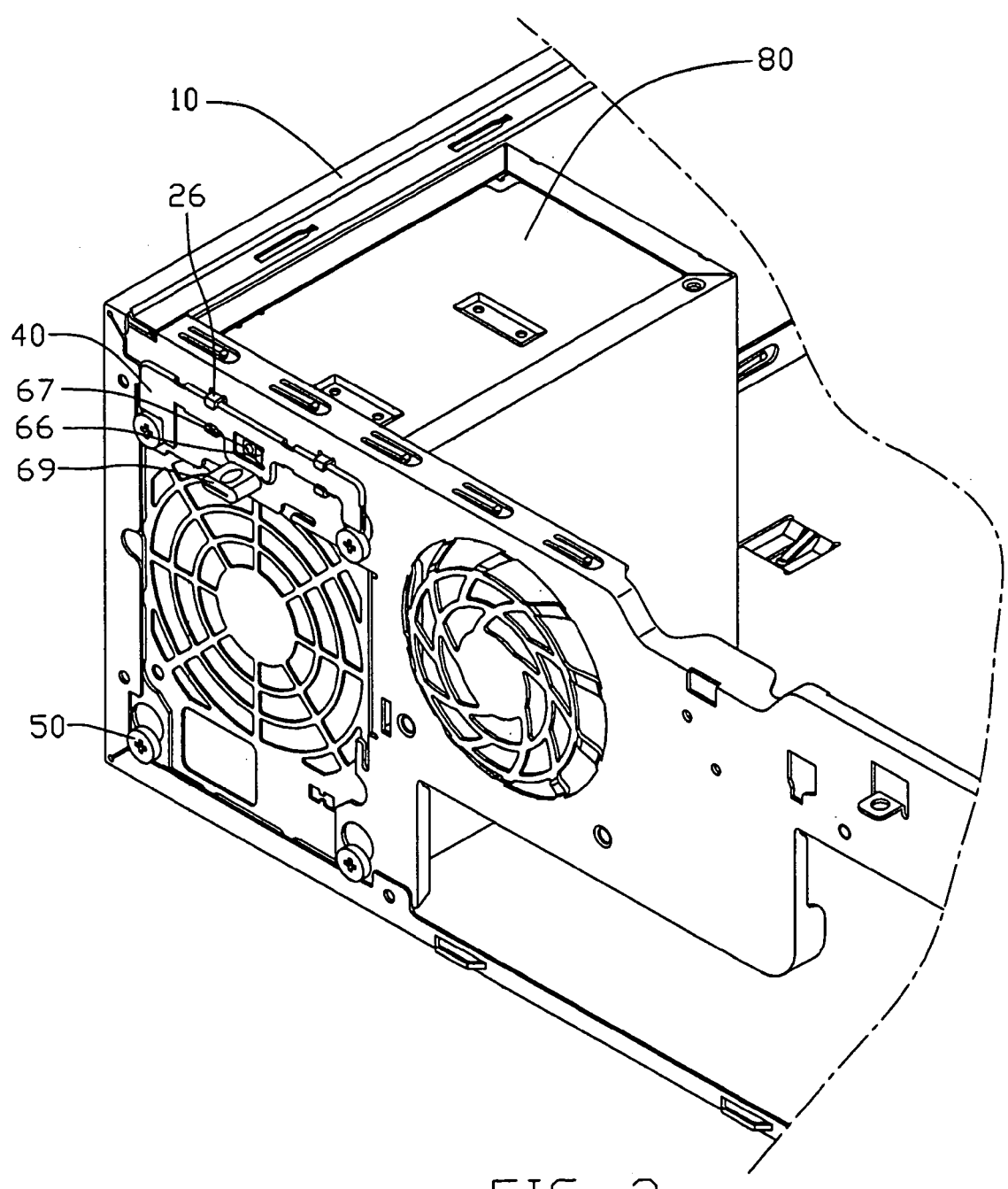
FIG. 3 is an assembled view of the present invention.

Referring to FIG. 3, the fixing plate 40 is pushed upwardly by holding the handle 69 until the ear 64 of the driving tab 63 touches the head 52 of the screw 50. During the movement, the body of the fixing plate 40 slides along the guiding rails 26. The driving tabs 62, 63 abut against the heads 52 of the right two screws 50. The boss 67 of the resilient tab 66 moves into the upper locating hole 23 and is secured therein because of flexibility of the tab 66. Thereby, the power supply is secured by the fixing plate 40.

In disassembly, the fixing plate 40 is pushed downwardly to have the driving tabs 62, 63 moving downwardly and releasing the originally secured screws 50. Thereby, the power supply 80 is able to move horizontally to have the screws 50 sliding into the large portions 221 of the apertures 22. Then, the power supply 80 is detachable from the rear panel 20 of the chassis 10, with the screws 50 withdrawn from the apertures 22.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer power supply mounting apparatus comprising:
   a plurality of screws adapted to be attached to a power supply, each of the screws having a head and a body, a diameter of the head being larger than a diameter at the body;
   a computer chassis including a rear panel, a plurality of apertures being defined in the rear panel for receiving the screws, each of the apertures including a large portion and a small portion, a diameter of the large portion being larger than the diameter of the head of the screw, a diameter of the small portion being smaller than the diameter of the head of the screw, but larger than the diameter of the body of the screw; and
   a fixing plate slidably attached to the rear panel and selectively positioned at a first position and a second position, the fixing plate having at least one lateral driving tab for abutting against a corresponding screw;
   whereby when the plurality of screws is attached to the power supply, and inserted into the apertures of the rear panel from the large portions to the small portions thereof, the fixing plate is pushed from the first position to the second position, thereby said at least one driving tab abutting against the corresponding screw and preventing them sliding from the small portions to the large portions.

2. The computer power supply mounting apparatus as claimed in claim 1, wherein an opening is defined in the rear panel for the power supply exposed.

3. The computer power supply mounting apparatus as claimed in claim 2, wherein a supporting rack is folded at the lower edge of the opening for supporting the power supply.

4. The computer power supply mounting apparatus as claimed in claim 1, wherein a pair of guiding rails is formed on the rear panel for the fixing plate.

5. The computer power supply mounting apparatus as claimed in claim 4, wherein each of the guiding rails comprises a pair of separated tongues stamped from the rear panel.

6. The computer power supply mounting apparatus as claimed in claim 5, wherein the fixing plate has an elongate body with two pairs of notches defined at opposite edges corresponding to the pair of guiding rails.

7. The computer power supply mounting apparatus as claimed in claim 1, wherein a resilient tab extends from the fixing plate with a boss formed thereon, and a pair of locating holes is defined in the rear panel for engaging with the boss.

8. The computer power supply mounting apparatus as claimed in claim 1, wherein the fixing plate has a pair of driving tabs formed at two ends thereof.

9. The computer power supply mounting apparatus as claimed in claim 1, wherein a handle is formed on the fixing plate.

10. A computer comprising:
    a power supply having a plurality of retention members, each of the retention members having a head and a body, a diameter of the head being larger than a diameter of the body;
    a computer chassis including a rear panel, a plurality of apertures being defined in the rear panel corresponding to the retention members, each of the apertures including a large portion and a small portion, a diameter of the large portion being larger than the diameter of the head of the retention member, a diameter of the small portion being smaller than the diameter of the head of the retention member, but larger than the diameter of the body of the retention member; and
    a fixing plate having at least one driving tab, whereby when the power supply is attached to the rear panel with the retention members, said at least one driving tab of the fixing plate abuts against a corresponding retention member of the power supply, and prevents the retention members sliding from the small portions to the large portions of the apertures.

11. The computer as claimed in claim 10, wherein the fixing plate is slidably attached to the rear panel and selectively positioned at a first position and a second position.

12. The computer as claimed in claim 11, wherein a pair of guiding rails is formed on the rear panel for the fixing plate.

13. The computer as claimed in claim 12, wherein each guiding rail comprises a pair of separated tongues stamped from the rear panel.

14. The computer as claimed in claim 13, wherein the fixing plate has an elongate body with two pairs of notches defined at opposite edges corresponding to the pair of guiding rails.

15. The computer as claimed in claim 11, wherein a resilient tab extends from the fixing plate with a boss formed, and a pair of locating holes is defined in the rear panel for engaging with the boss.

16. The computer as claimed in claim 11, wherein the fixing plate has a pair of driving tabs formed at the two ends thereof.

17. A computer power supply mounting apparatus comprising:
    a rear panel;
    a plurality of screws adapted for abutting a power supply against the rear panel;

a plurality of apertures defined in the rear panel for receiving the screws, and restricting the screws moving in a first direction in the plane of the rear panel; and a fixing plate slidably attached to the rear panel, at least one driving tab being formed on the fixing plate for abutting against the screws, thereby restricting the screws moving in a second direction in the plane of the rear panel, the second direction being perpendicular to the first direction.

18. The computer power supply mounting apparatus as claimed in claim 17, wherein each of the screws has a head and a body, a diameter of the head being larger than a diameter of the body.

19. The computer power supply mounting apparatus as claimed in claim 18, wherein each aperture includes a large portion and a small portion, a diameter of the large portion being larger than the diameter of the head of the screw, a diameter of the small portion being smaller than the diameter of the head of the screw, but larger than the diameter of the body of the screw.

20. The computer power supply mounting apparatus as claimed in claim 17, wherein a resilient tab extends from the fixing plate with a boss formed, and a pair of locating holes is defined in the rear panel for engaging with the boss.

21. A computer power supply mounting apparatus of an electronic device chassis having a power supply installed therein, comprising:

a rear panel of said electronic device chassis having a mounting member formed thereon;

a reference plane defined by a side of said power supply incorporated with said rear panel, a complementary mounting member defined on said side of said power supply, combination of said mounting member and said complementary mounting member defining a first relative position to allow movement of said power supply along a direction not located on said reference plane, and a second relative position thereof to restrict said movement; and a fixing member movable along said reference plane to selectively block movement of said combination of said mounting member and said complementary member from said first relative portion to said second relative position.

22. The computer power supply mounting apparatus as claimed in claim 21, wherein a direction of said movement of said combination of said mounting member and said complementary mounting member is defined on said reference plane, and said direction is perpendicular to a moving direction of said fixing member.

23. The computer power supply mounting apparatus as claimed in claim 21, wherein said mounting member is an aperture having adjoined a small position and a large portion, and said complementary mounting member comprises at least one portion having a diameter larger than the one of said small portion of said aperture and smaller than the one of said large portion of said aperture.

* * * * *